April 18, 1939.    W. E. HASELWOOD    2,154,615
HOLLOW SHAFTED CONTROL UNIT
Filed Sept. 29, 1938
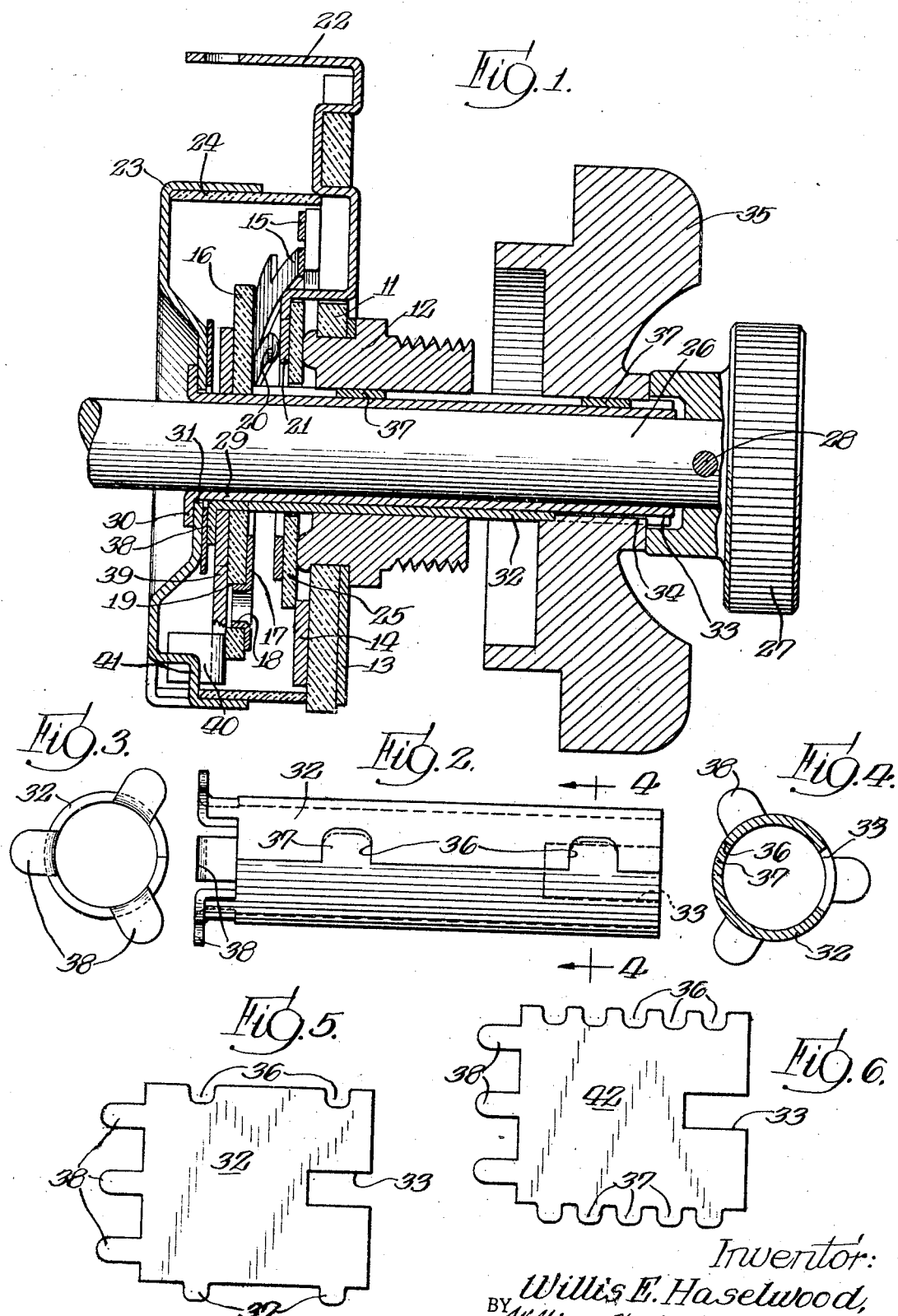
Inventor:
Willis E. Haselwood,
BY Wilkinson, Huxley, Byron & Knight
ATTORNEYS.

Patented Apr. 18, 1939

2,154,615

UNITED STATES PATENT OFFICE 2,154,615

HOLLOW SHAFTED CONTROL UNIT

Willis E. Haselwood, Elkhart, Ind., assignor to Chicago Telephone Supply Company, Elkhart, Ind., a corporation of Indiana Application September 29, 1938, Serial No. 232,297

5 Claims. (Cl. 74—10)

This invention relates to a new and improved hollow shafted control unit, and more particularly to the construction and arrangement of the hollow shaft of the unit.

It has become the practice to reduce the number of control locations for radio sets and this is particularly true of automobile radios where the space available is often quite limited. In general in such units it is desired to have two control locations and in the simpler sets one control knob selects the station while the other knob turns the set off and on and controls the volume with the usual combined switch and volume control. In the more complete sets it is desired to add other controls such as a tone control and a local and distance control. The use of three or more controls in two control locations requires that one or more of the controls be operated by means of a hollow shaft with the shaft for a second control extending through the hollow shaft and rotatable independently thereof.

In devices of this character the cost of the unit is extremely important insofar as the commercial success of the device is concerned. In order to give adequate clearance for an inner shaft the tubular shafts must have quite thin walls, for example, of the order of .018 inch thick. Extruded brass tubing of suitable thinness of wall is so difficult to manufacture that the cost is prohibitive. Tubing drilled out of solid rod is also commercially impractical since the labor of drilling it and stock waste render it too costly.

The least expensive method of making a sleeve of this thickness is to use flat stock and form it into a tubular sleeve. When so formed the tube has a longitudinal seam or line of junction of the meeting edges. To secure these edges permanently together also presents a cost problem. If the edges are not united, the shaft may function satisfactorily under low torques but be unsatisfactory when heavier forces are applied. The torque necessary to operate the radio control device may be quite low but most such devices are not capable of complete rotation and are operated through limited arcs with stops at their ends of movement. When the control unit is carelessly or improperly operated, there may be a heavy torsional stress applied to the shaft causing a definite longitudinal movement of one side of the seam relative to the other side of the seam. In addition, there may be a tendency for one side to ride over or under the other edge. Such distortion may result in improper drive or in injury to the unit. It may result in binding both of the unit itself and upon the inner shaft used to operate another control.

It is an object of the present invention to provide a new and improved hollow shafted control unit and shaft arrangement therefor.

It is a further object to provide a tubular shaft construction which is simple in design and inexpensive to manufacture.

It is an additional object to provide a seamed shaft construction in which the edges of the seam are designed for mutual support.

It is also an object to provide a unit construction in which the tubular shaft is adequately supported and restrained against distortion.

It is a further object to provide a shaft and drive connection in which the torque is applied at a point spaced from the seam.

Other and further objects will appear as the description proceeds.

I have shown certain preferred embodiments of my invention in the accompanying drawing, in which—

Figure 1 is a longitudinal section of a unit equipped with my improved tubular shaft;

Figure 2 is an elevation of the shaft;

Figure 3 is a view of Figure 2 as seen from the left;

Figure 4 is a section taken on line 4—4 of Figure 2;

Figure 5 is a view of the blank used for forming the shaft of Figures 1 to 4, inclusive; and Figure 6 is a view similar to Figure 5 but showing a modified form of blank.

The specific variable resistance unit shown in Figure 1 is disclosed in detail in the copending application Serial No. 218,062, filed July 8, 1938, by Newton C. Schellenger, and forms no part of the present invention. It will be described herein only to the extent necessary to bring out the cooperation of the improved shaft with the unit.

The unit comprises the insulating base 11 and the shaft supporting thimble 12 fixedly secured to the base and holds the metal plate 13 against the base. The base 11 carries the arcuate resistance strip 14 which is engaged by the spring contacts 15. These contacts 15 are rotated by means of the insulating drive disc 16. The contacts 15 are integrally connected to the plate 17 which has a turned up portion 18 fitting in the opening 19 in the disc 16. This plate 17 also carries the sliding contact 20 which engages the metal ring 21. This metal ring 21 is integrally connected to the terminal 22.

The variable resistance unit is enclosed by the metallic housing 23 having a cylindrical insulating liner 24 therein. The insulating washer 25 is located between the member 21 and the thimble 12 to insulate the sliding contact arrangement and terminal 22 from the bushing 12 and consequently from the metallic shafts within the bushing. The central shaft 26 passes through the bushing 12 and all the way through the variable resistance unit for the operation of any other control which is not shown. The shaft has the knob 27 keyed thereto by means of the pin 28 for rotation of the shaft. The spacing sleeve 29 is fitted upon the shaft 26 and has ears 30 fitted in notches 31 in the cover 23 and bent down against the outer face of the cover in order to hold the sleeve against rotation and maintain it in proper position.

The tubular drive shaft 32 for the resistance unit shown is fitted about the sleeve 29 and is provided with the notch or cut-away portion 33 adapted to receive the lug 34 on the knob 35, whereby the knob 35 serves to rotate the shaft 32. This notch is located opposite to the seam in the shaft to minimize the effect of drive torque along the seam. It will be apparent that the knob 35 is held in position axially of the shaft by means of the knob 27, which is keyed to the inner shaft 26.

As shown in Figure 5, the shaft 32 is formed of a flat blank having a plurality of notches 36 in one edge and a plurality of complementary lugs 37 in the opposite edge. The inner end of the shaft is provided with a plurality of spaced lugs 38. These lugs 38 fit in notches in the insulating drive disc 16 of the unit and are then bent over against the outer face of the metallic washer 39 as clearly shown in Figure 1. The portions of the end of the shaft between the lugs 38 bear against the under face of the drive disc 16 so that when the lugs 38 are turned over parallel to the upper face, the sleeve is fixedly assembled in driving relation to the drive disc. The metal washer 39 has the stop lug 40 formed thereon which is adapted to engage the stop member 41 formed in the cover, to limit rotation of the shaft and movable contact means.

Preferably the lugs 37 make a very close fit in the notches 36 so as to prevent any longitudinal displacement of the adjacent edges of the tubular shaft. It will be apparent that any sliding movement between these two edges will tend to cause a binding action upon the sleeve 29 and in addition will cause displacement of the lugs at the inner end of the shaft with consequent distortion of the drive disc 16. Extreme distortion of the tubular shaft would cause the parts to bind in such manner as to prevent operation, and might even so bind the inner shaft 26 as to prevent operation of that shaft.

It will be noted in Figure 1 that the two lugs 37 are located respectively within the bushing 12 and the operating knob 35. Because of this location these lugs are supported inwardly by the shaft and outwardly by the bushing and knob. This support, in view of the close fit between the parts, absolutely prevents the ears from riding up out of the notches in the shaft.

In the form of construction shown in Figure 6 the blank 42 has a greater number of notches and interfitting lugs than in the construction of Figures 1 to 5. This may be desirable in order to have more numerous points for transferring the strain from one edge to the other. It is to be noted, however, that in this form of construction certain of the lugs will be within the bushing and operating knob and thus will be adequately supported and prevented from sliding out of their corresponding notches even under heavy strain.

While for ordinary purposes the construction shown will be adequately strong without any additional connecting means, in some cases it may be desirable to apply a plating to the tubular shaft after its formation. As an example, it may have an electroplating of tin applied thereto. In this case, with the lugs and notches closely interfitting, the gap between them will be so small that the tin applied by the plating operation will bridge the gap and considerably strengthen the sleeve. The sleeve may be further strengthened by passing it through an oven after the plating operation, so as to melt the tin and insure its most effective bond along the meeting edges, both around the lugs and at other points.

Sleeves of the type disclosed have been tested in actual operation and found to be much stronger than sleeves of similar material without the interlocking construction. A torque which will give a permanent set to a shaft without the interfitting ears and notches will have no effect whatever on a shaft of the type shown, and in fact tests have shown that the shaft of the present application will withstand, without permanent set, a torque many times that which will permanently distort a shaft with merely straight meeting edges.

While I have shown certain preferred embodiments of the invention, it is capable of modification and change to meet varying conditions and requirements and I contemplate such modifications as come within the spirit and scope of the appended claims.

I claim:

1. A hollow shafted control unit comprising a base, a shaft bearing upon the base, control mechanism upon the base, a hollow shaft supported in said bearing and operatively associated with the control mechanism, said shaft having a longitudinally extending seam, and interfitting notches and lugs formed from the metal upon opposite sides of the seam, at least one of said interfitting lugs and notches being located within said shaft bearing.

2. A hollow shafted control unit comprising a base, a shaft bearing upon the base, control mechanism upon the base, a hollow shaft supported in said bearing and operatively associated with the control mechanism, said shaft having a longitudinally extending seam, interfitting notches and lugs formed from the metal upon opposite sides of the seam, at least one of said interfitting lugs and notches being located within said shaft bearing, and means within the hollow shaft supporting it against inward deformation.

3. A hollow shafted control unit comprising a base, a shaft bearing upon the base, control mechanism upon the base, a hollow shaft supported in said bearing and operatively associated with the control mechanism, an operating knob upon the other end of the shaft, said shaft having a longitudinally extending seam, interfitting lugs and notches formed from the metal upon opposite sides of the seam, at least one of the interfitting lugs and notches being located within the shaft bearing and at least one within the operating knob.

4. A hollow shafted control unit comprising a base, a shaft bearing upon the base, control mechanism upon the base, a hollow shaft supported in said bearing and operatively associated with the control mechanism, said shaft having a longitudinally extending seam, the shaft having a cut-away portion formed in its outer end substantially opposite to the seam, an operating knob upon said outer end of the shaft, and an inwardly extending member on said knob fitting in the cut-away portion of the shaft.

5. A hollow shafted control unit comprising a base, a shaft bearing upon the base, control mechanism upon the base, a hollow shaft supported in said bearing and operatively associated with the control mechanism, said shaft having a longitudinally extending seam, the shaft having a cut-away portion formed in its outer end substantially opposite to the seam, and operating knob upon said outer end of the shaft, and an inwardly extending member on said knob fitting in the cut-away portion of the shaft, said shaft having interfitting notches and lugs formed from the metal upon opposite sides of the seam, at least one of the lugs and notches being within the shaft bearing and at least one being within the operating knob.

WILLIS E. HASELWOOD.